United States Patent
Zhou et al.

(10) Patent No.: US 11,516,439 B1
(45) Date of Patent: Nov. 29, 2022

(54) UNIFIED FLOW CONTROL FOR MULTI-CAMERA SYSTEM

(71) Applicant: Black Sesame International Holding Limited, San Jose, CA (US)

(72) Inventors: Ying Zhou, Cupertino, CA (US);
Zheng Qi, Cupertino, CA (US);
Chengyu Xiong, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/460,955

(22) Filed: Aug. 30, 2021

(51) Int. Cl.
*H04N 7/18* (2006.01)
*G06T 1/60* (2006.01)
*H04N 5/225* (2006.01)

(52) U.S. Cl.
CPC .............. *H04N 7/181* (2013.01); *G06T 1/60* (2013.01); *H04N 5/2258* (2013.01)

(58) Field of Classification Search
CPC ......... H04N 7/181; H04N 5/2258; G06T 1/60

USPC .......................................................... 386/223
See application file for complete search history.

(56) References Cited

U.S. PATENT DOCUMENTS

| 10,999,794 | B2 * | 5/2021 | Palenius | ............... H04B 7/0874 |
| 11,315,209 | B2 * | 4/2022 | Zhou | ......................... G06T 1/60 |
| 2019/0313026 | A1 * | 10/2019 | Cheng | ........................ H04J 3/14 |
| 2021/0067656 | A1 * | 3/2021 | Holland | .................. G06F 13/18 |
| 2022/0308817 | A1 * | 9/2022 | Saini | .......................... G06T 9/00 |

* cited by examiner

*Primary Examiner* — Helen Shibru
(74) *Attorney, Agent, or Firm* — Timothy T. Wang; Ni, Wang & Massand, PLLC (57) ABSTRACT

The invention discloses a method and a system for achieving a unified flow control system for multiple camera devices. The system provides inline and offline streams to share resources by converting the streams into one another. The resource sharing is performed by using different time interval to process inline and offline streams. The system also includes a STALL & REDO operation to keep whole image un-broken and shut down the write stream from ISP right away.

14 Claims, 5 Drawing Sheets

UNIFIED FLOW CONTROL FOR MULTI-CAMERA SYSTEM

FIELD OF INVENTION

The present disclosure relates generally to a unified flow control system for multi-camera devices. More particularly, the present disclosure relates to a method for achieving unified flow control of multiple streams for a multiple camera devices.

BACKGROUND OF THE INVENTION

Taking the light from your camera sensor and transforming that into a beautiful image is a complicated process involving a significant amount of processing. Fortunately, digital cameras handle this in an efficient way through the use of a dedicated ISP as there are several noise factors that degrade the quality of an image. The basics regarding ISP tuning like how your camera works, making it appropriate for a wide range of camera systems, including high-quality digital cameras, sports cameras, surveillance, smart phones, drive recorders, mobile devices and video-image-based industrial equipment.

Traditionally, there are inline streams and offline streams that already exist in the market. Moreover, the Inline streams are data streams from sensors that after processed in ISP engine to be written in DDR. The offline streams are data streams from sensors, write to DDR, read from DDR and processed in ISP Engine, write to DDR. But the resource sharing between the inline and offline streams was not possible.

Currently, a few of the related technologies on controlling the stream flow for the multi-camera device is multiple CMOS sensors image signal processing. A CMOS sensor is an image sensor type that comprises of an array of pixels, each containing a photo detector and active amplifier widely used in digital camera technologies such as cell phones, CCTV, web cameras, etc. Moreover, an image signal processing (ISP) pipeline provides a method to convert an image into digital form by performing operations like demosaicing, noise reduction, auto exposure, autofocus, auto white balance and image sharpening designed for digital processing and image quality enhancement.

Still, there is no technology to that can provide bandwidth optimization by time sharing operation. The resources can be shared by merging different inline and offline streams and modifying a quality of service in a cost effective way.

Therefore, to overcome the drawbacks mentioned in the above-mentioned prior arts, a unified flow control for multi-camera devices. The system provides a solution for SoC to support multiple cameras. The solution would improve SoC flow control robustness and flexibility, decrease expensive local SRAM capacity requirement, and save over SoC area by sharing lots of ISP logic with inline and offline streams while offline streams would not block or delay inline streams.

Thus, it is apparent now that numerous methods and systems are developed in the prior art that is adequate for various purposes. Furthermore, even though these inventions maybe suitable for the specific purposes to which they address, accordingly, they would not be suitable for the purposes of the present invention as heretofore described. Thus, there is a need for a method for achieving unified flow control of multiple streams for a multiple camera device. Moreover, there is a Low FIFO (SRAM) requirement and supporting inline and offline streams at low cost, being flexible and robust to multiple applications.

SUMMARY OF THE INVENTION

In accordance with the present invention, there are inline streams and offline streams, our invention support both inline and offline streams. They are their own advantages and disadvantages so they are both important to our system. On one side Inline streams are data streams from sensors, after processed in ISP engine, write to DDR. On the other side offline streams are the data streams from sensors, write to DDR, read from DDR and processed in ISP Engine, write to DDR.

The primary objective of the present invention is to provide a method for achieving unified flow control of multiple streams for a multiple camera devices. The method involves monitoring of the multiple streams for the multiple camera devices through a processor. Then the multiple streams are identified as either an inline stream or offline stream. The Inline streams are processes by reading the inline stream from multiple camera devices through mobile industry processor interface (MIPI). The inline streams are stored in a first queue by a first FIFO structure. The offline streams are processed by saving the offline stream via MIVI interface into DDR. The offline streams are read from the DDR and the offline stream are stored in a second queue by utilizing a second FIFO structure.

The resource sharing is performed by sharing bandwidth between the inline stream and the offline stream by providing different time slots through an image signal processor (ISP) to form shared streams. The shared streams are checked for any priority enablement. And finally, a write operation is performed after checking status of write FIFO and storing content of the write FIFO in the DDR to achieve unified flow control of the multiple streams.

The other objective of the present invention is to provide a solution for SoC to support multiple cameras. The solution would improve SoC flow control robustness and flexibility, decrease expensive local SRAM capacity requirement, and save over SoC area by sharing lots of ISP logic with inline and offline streams while offline streams would not block or delay inline streams.

The other objective of the present invention is that the inline stream and the offline stream are controlled to adjust a quality of service (QoS).

Yet another objective of the present invention is to provide a HURRY operation for performing priority enablement. The HURRY operation pushes a low priority streams from the shared stream to avoid blocking of a high priority streams from shared streams.

The other objective of the present invention is to provide a STALL and a REDO operation. The STALL would stop offline streams but STALL would lose some data so after STALL, REDO should be taken to restore the lost data.

The other objective of the present invention is to provide a resource sharing operation. The Inline and Offline streams can share one ISP engine in different time slot. Like in one time slot, process one line of inline stream, in other time slot, process one line of offline stream. There are mainly two kinds of resource in our system, calculation units and memories. The inline and offline streams can share both of them by access them in different time slot.

The another objective of the present invention is to provide a stream back pressure. When offline streams can't have enough bandwidth to write in a short of period, the offline streams can stop reading, thus stop generating new write requests to avoid overflow the queue.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

The present invention supports both inline and offline streams. They have their own advantages and disadvantages so they are both important to the system. The inline streams from camera include low latency requirement. Cameras are very hard to stop during inline streams.

The inline stream improves QoS (priority) when bandwidth is not enough. Also, drop frames when FIFO is overflowed. The offline streams are processed from DDR, latency requirement is much lower. The offline streams could Improve QoS (Priority) when bandwidth is not enough. The offline streams could stop reading or writing before FIFO is overflowed. The offline stream decreases performance when there is not enough bandwidth, frames should not be dropped. The offline streams could not block at any time.

The invention provides solutions for SoC to support multiple cameras. The solution would improve SoC flow control robustness and flexibility, decrease expensive local SRAM capacity requirement, and save over SoC area by sharing lots of ISP logic with inline and offline streams while offline streams would not block or delay inline streams.

Figure 1:
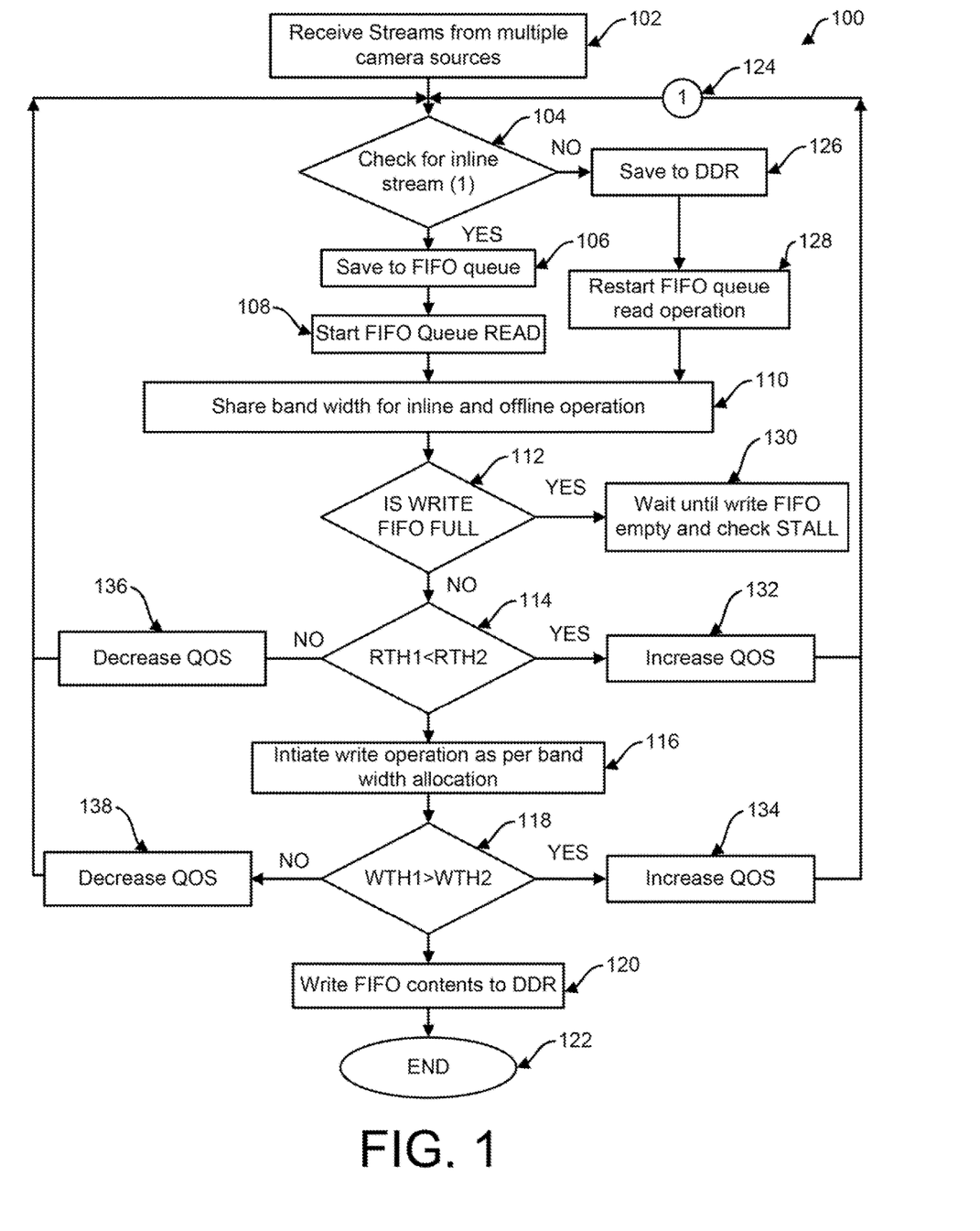
FIG. 1 illustrates a process flow diagram for providing unified flow control system for a multiple camera devices in accordance with the present invention.

The FIG. 1 illustrates a process flow for achieving unified flow control of multiple streams for a multiple camera device. The process flow 100 includes receiving multiple forms of streams from the multiple camera sources 102 as one or more received streams and monitoring or checking the one or more received streams for inline streams 104 by the processor.

Identifying the one or more received stream as one or more identified stream, the one or more identified stream is an inline stream or an offline stream.

The one or more identified streams are saved to FIFO queue 106 and are processed. The FIFO queue operation helps to avoid peak bandwidth pressure to break streams to buffer some data. The one or more identified streams are processed by multiple types of processing including an inline stream processing and an offline processing stream. The Inline stream processing, the one or more identified stream is the inline stream, further wherein the inline processing includes:

I. Reading the inline stream from multiple camera sources utilizing mobile industry processor interface (MIVI);

II. Initiating a READ operation 108, wherein the READ operation is initiated once a RTH condition is checked of RTH1 and RTH2, further wherein the condition is RTH1 is lesser than the RTH2:

III. Storing the inline stream into queue utilizing first in first out (FIFO) first structure;

The Offline stream processing occurs if the condition for inline streams is NO, the one or more identified stream is the offline stream, further the offline processing includes:

I. Directly saving the received camera stream via MIVI interface into DDR 126;

II. Initiating a READ operation on the saved offline stream 128, wherein the READ operation is initiated once a RTH condition is checked of RTH1 and RTH2, further wherein the condition is RTH1 is lesser than the RTH2;

III. Reading the saved stream from DDR and storing the offline stream into queue utilizing FIFO second structure.

The system shares resources by sharing bandwidth for multiple stored streams 110. The sharing is done by providing a different time slot to each stream through the image signal processor (ISP). The one or more stored streams in the ISP are controlled to adjust a quality of service (QoS). The RTH and WTH are conditional parameters to adjust the QoS.

The RTH conditional parameters 114 include RTH1<RTH2 where ISP increases the QoS 132 of the one or more stored streams, RTH1>RTH2 where ISP decreases the QoS 136 or RTH1=RTH2 initiates the write operation. Similarly with the WTH conditional parameters 118, if WTH1>WTH2 the QoS is increased 134, WTH1<WTH2 the QoS is decreased 138 and if WTH1=WTH2 the streams are forwarded for Write FIFO and saved in DDR 120. The modified streams with the increased or decreased values are sent to $1^{st}$ level 124 to be checked again.

The time slots include a first time slot and a second time slot. The first time slot processes one line of the inline stream and the second time slot processes one line of the offline stream. QoS is setup to let system control to decide which streams have higher priority when there is congestion or when the peak bandwidth requirement is over DDR bandwidth. The higher priority streams would get better service.

Checking the streams for any priority enablement, the priority enablement is performed through a HURRY operation. The HURRY operation pushes a low priority streams from the shared stream to avoid blocking of a high priority streams from shared streams.

Performing a write operation after checking status of write FIFO and storing the contents of write FIFO in the DDR 120 to achieve unified flow control of streams. The write operation is performed directly when the status of the write FIFO is empty. An assertion to READ FIFO is sent to perform STALL function when the status of the write FIFO is full. The STALL function stops reading further shared streams till the WRITE FIFO is empty.

Once STALL option is on and a packet is through away, the Read FIFO can re-send the packet so the whole frame would not be broken. ISP pipe would send ACK to Read FIFO after receive entire packet, Read FIFO would overwrite the packet with new data after getting ACK. A STALL & REDO operation together would keep whole image un-broken and shut down the write stream from ISP right away. Read FIFO gets ACK from ISP pipe, then Read FIFO could release the occupied space to get new packet. Once there is no room in Read FIFO, Read FIFO would stop reading.

The benefits of STALL and REDO included are—They can stop data streams to Write FIFO in very short time. They reduces the worry about too much reserved space in Write FIFO while camera resolution becomes bigger and bigger. They make FIFO space independent with camera resolution and data structure. They make system more robust and less configuration to setup. Multiple offline streams can be stalled together. The STALL operation does not impact inline streams. They removes the need to setup watermark while supporting different cameras.

If DDR write bandwidth is not enough in a very short of period, (if DDR bandwidth is always not enough, back pressure won't work), system can stop offline reading by certain period, wait for other high priority streams release more bandwidth, then let offline stream back to work.

The offline queue is a function In order to stop writing to DDR for a certain period, there should be a queue, which can buffer some data, to avoid peak pressure to break streams.

Figure 2:
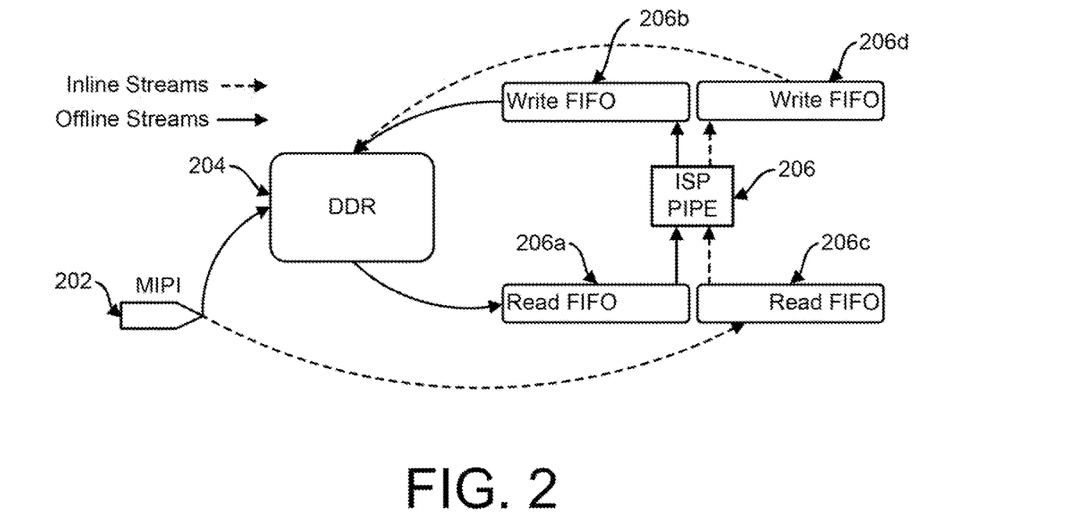
FIG. 2 illustrates an inline and an offline resource sharing to achieve unified flow control in accordance with the present invention.

FIG. 2 illustrates the inline and offline resource sharing 200. The inline and offline streams share one ISP in two different time slots. The first time slot processes one line of the inline stream, similarly the other time slot processes one line of the offline stream. Moreover, the inline streams are the data streams from sensors (MIPI) 202, read by read FIFO (206*c*) and there after processed in ISP engine 206, write to DDR from the write FIFO (offline 206*b*, inline 206*d*). The offline streams are the data streams from sensors (MIPI) 202, write to DDR 204, read from DDR to read FIFO (206*a*) and processed in ISP Engine, write to DDR.

The system may convert some inline streams to offline streams and share with other inline streams. There are mainly two kinds of resource in our system, calculation units and memories. The inline and offline streams can share both of them by access them in different time slot.

Inline and offline streams would share resources in many cases. Primarily for the conversion of, the inline streams to the offline streams. Alternatively, the inline and offline streams would share resources to save design area or to provide flexibility for a variety of applications.

Figure 3:
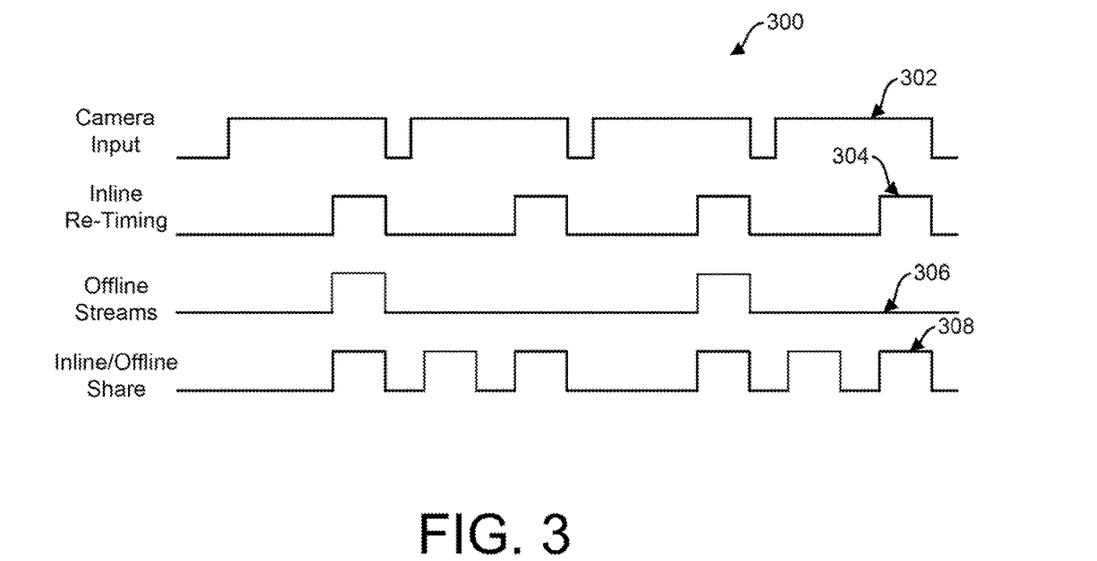
FIG. 3 illustrates timing synchronization for the inline and the offline sharing in accordance with the present invention.

FIG. 3 illustrates the timing for inline and offline sharing 300. The figure illustrates the cycle in different time constraints. The first is the camera input 302, second is of inline re-timing 304, the third one is the offline streams 306 and the final one is the shared timing for inline and offline sharing 308. The inline and offline streams share one ISP in two different time slots. The first time slot processes one line of the inline stream, similarly the other time slot processes one line of the offline stream. The inline and offline streams share resource using different time interval to process inline and offline streams.

The inline streams can't block offline stream in the similar way the offline streams also can't block inline streams too. The arbitrary inline and offline stream sharing, such as different resolutions, frames rates, and delays.

Figure 4A:
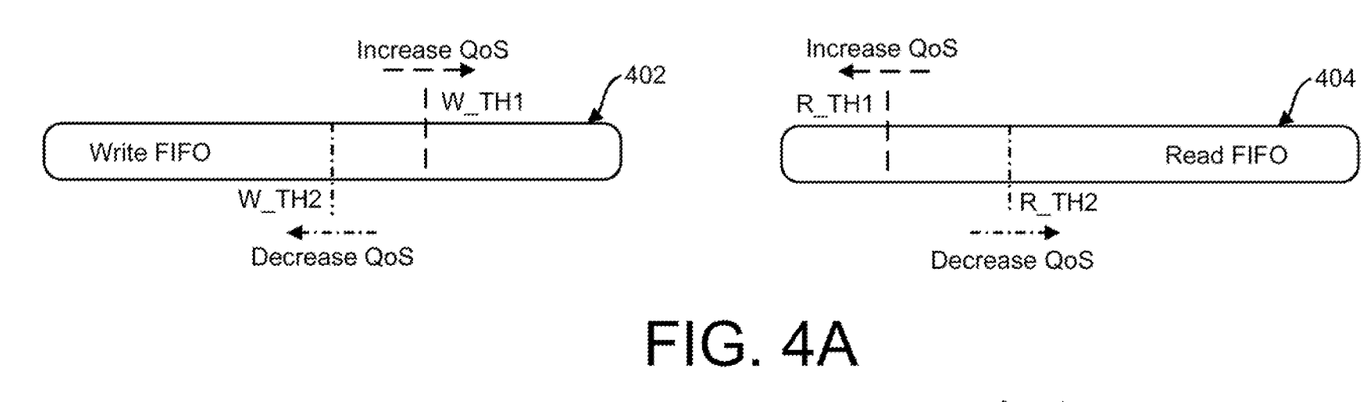
FIG. 4A illustrates an offline stream QoS and Hurry operations in accordance with the present invention.

FIG. 4A illustrates the Offline stream QoS and Hurry operations. QoS is setup to let system control to decide which streams have higher priority when there is congestion or when the peak bandwidth requirement is over DDR bandwidth. The higher priority streams would get better service. The QoS value is setup on the basis of write threshold 402 or on the basis of the read threshold 404.

'HURRY' is to used for pushing low priority transactions to avoid blocking high priority transactions. The two level water marks stops QoS back and forward movement too often.

Once the offline queue is almost full, e.g. above water mark, offline QoS would be increased so the offline streams would get more bandwidth. The inline stream and the offline stream are controlled to adjust a quality of service (QoS). The RTH1 and WTH1 are conditional parameters to adjust the QoS and RTH2 and WTH2 are received parameters from the offline stream.

Figure 4B:
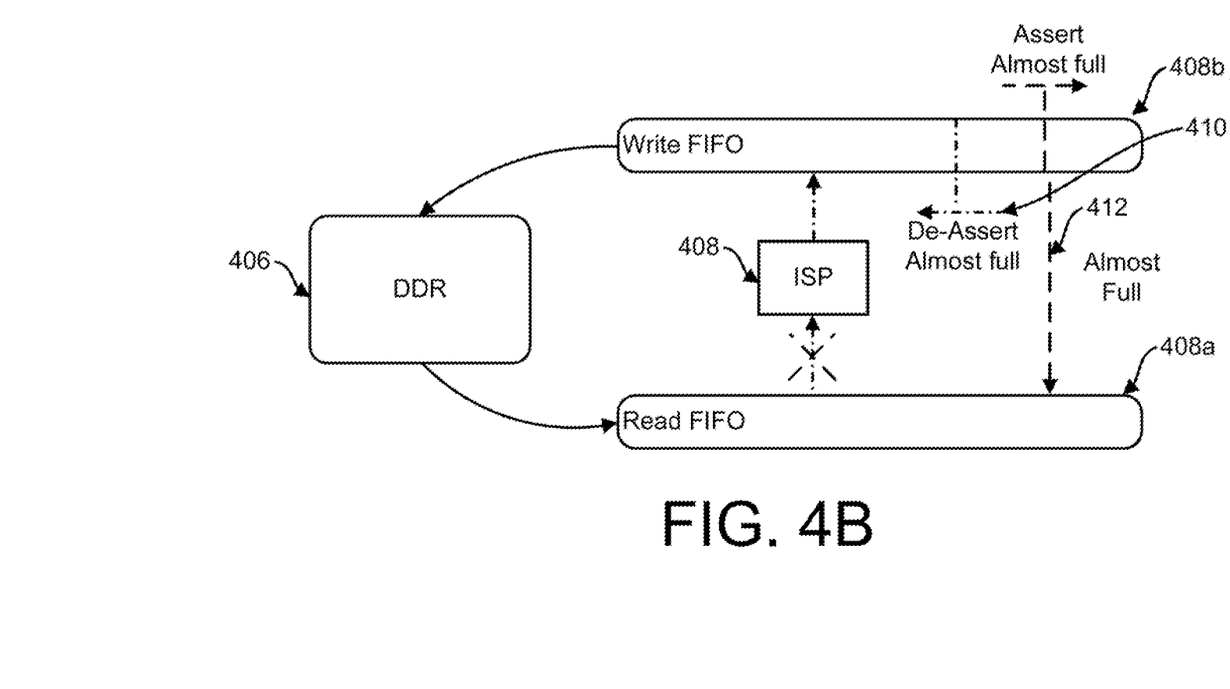
FIG. 4B illustrates an offline stream back pressure operation in accordance with the present invention.

FIG. 4B illustrates offline stream back pressure operation. The offline stream back pressure operation is performed by stopping offline reading for certain time. The concept is to wait for the other high priority stream release of more bandwidth, then let offline stream back to work. Hence, when offline streams can't have enough bandwidth to write in a short of period, the offline streams can stop reading, thus stop generating new write requests to avoid overflow the queue.

Once the Write FIFO 408*b* is almost full, offline streams read FIFO are stalled using following function: Before the Read FIFO 408*a* sends a line to ISP 408, checking if Write FIFO has enough space or not. If there is not enough space, read FIFO does not send the line to ISP and wait for the write FIFO to have enough space. Then utilizing two watermarks to assert (412) or de-assert almost full signal (410). The read FIFO can continue reading data from DDR 406 until FIFO is full.

Figure 4C:
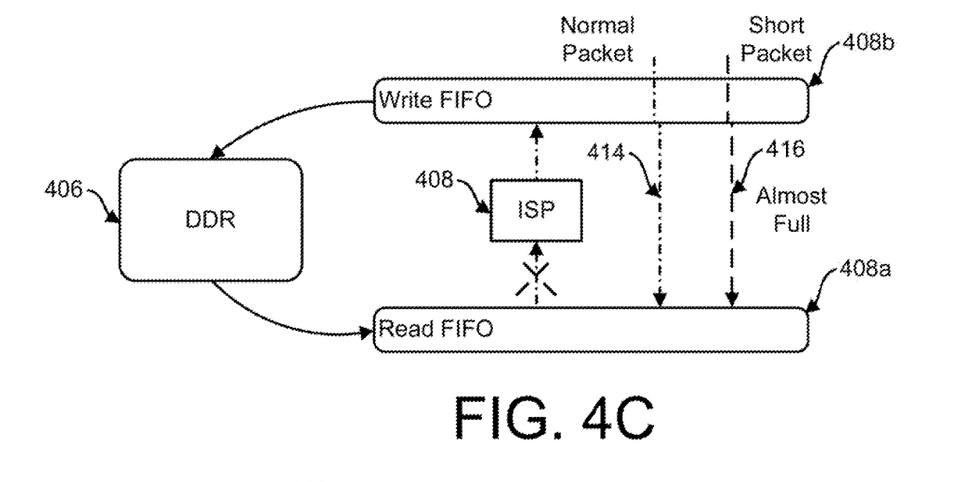
FIG. 4C illustrates an offline stream short packet operation in accordance with the present invention.

FIG. 4C illustrates offline stream short packet operation. Short packet operation is performed as Short packet requires less room in offline queue so offline queue would not toggle the QoS to acquire more bandwidth. Where, more bandwidth sometimes means less bandwidth for other devices.

While sensor resolution is increased, the line becomes longer and longer, thus to require more space in Write FIFO 408*b* when back pressure is on the Short packet 416 operation is performed. The short packet decreases the requirement for Write FIFO 408b capacity for back pressure. Thus leads to more efficient use ISP pipe, Read FIFO 408a usually hold entire packet in Read FIFO, then sent to ISP 408, Short packet 416 would also decrease Read FIFO 408a capacity requirement.

Figure 4D:
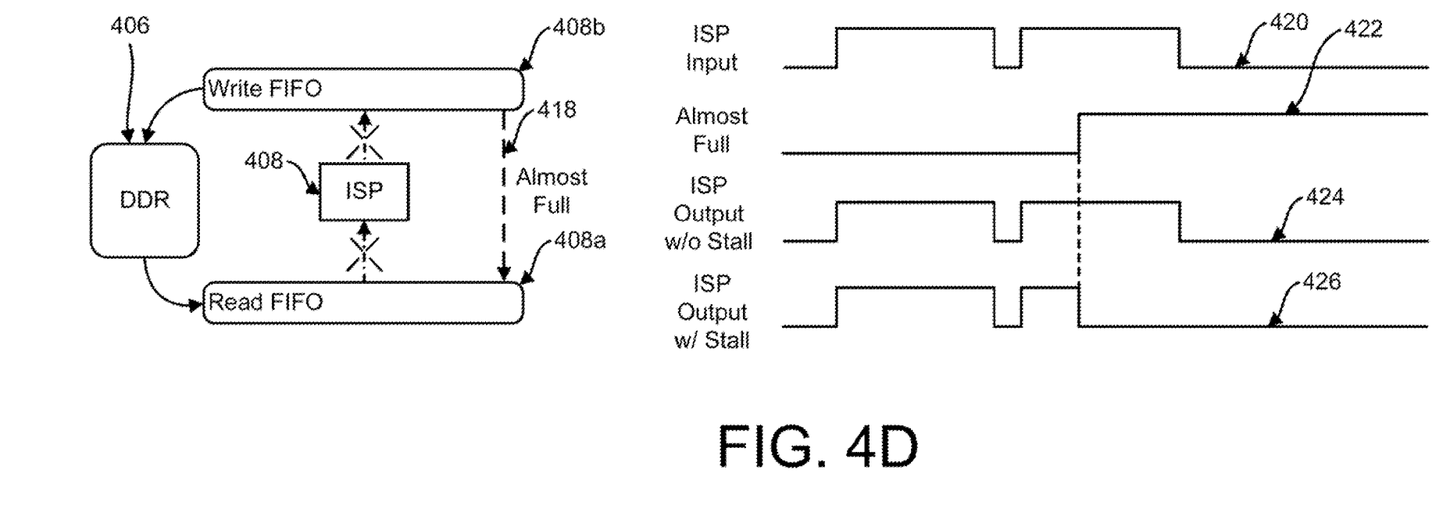
FIG. 4D illustrates an offline stream STALL operation in accordance with the present invention.

FIG. 4D illustrates the offline stream STALL operation. The function of the STALL operation 418 is to stop offline streams, but it may loose some data in the process. Thus a REDO operation is followed to restore the lost data.

Once Write FIFO 408b is almost full while ISP 408 is still in the middle of processing, the STALL option can let ISP stop processing the current packet right away. So there would be no data stream to Write FIFO 408b, thus Write FIFO 408b would not overflow, and Write FIFO 408b would not need to reserve big chunk of space before Read FIFO 408a sending data to ISP 408. The STALL 418 option makes write FIFO "almost full" flag independent to camera resolution. Thus, ISP can serve other inline streams while waiting for Offline Write FIFO going back to not full.

The figures demonstrates the changes in the conditions of when ISP input when write FIFO is empty 420 or almost full 422 and the ISP input when without STALL operation 424 and with STALL operation 426.

Figure 5:
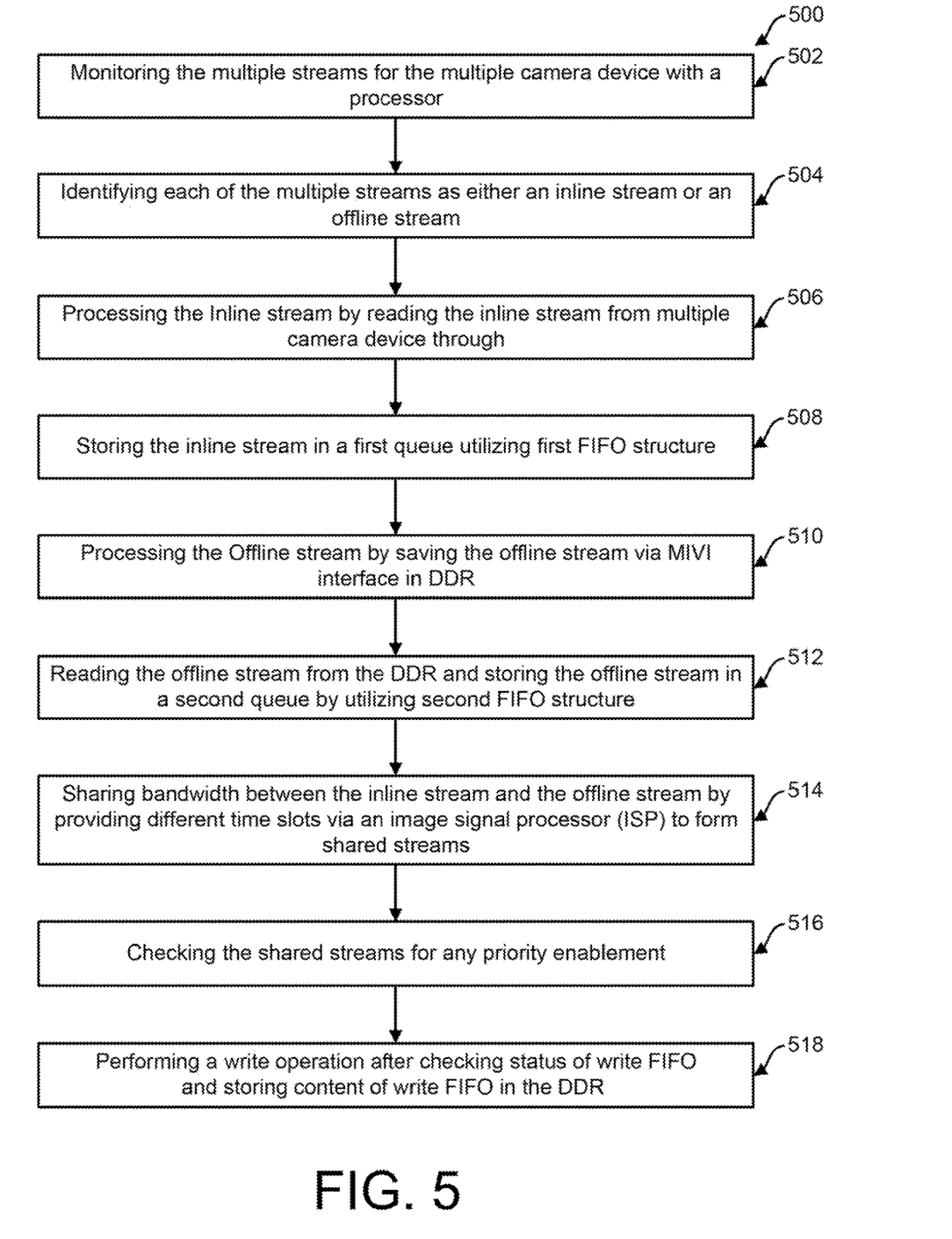
FIG. 5 illustrates a method for achieving the unified flow control system for the multiple camera devices in accordance with the present invention.

FIG. 5 illustrates the method for achieving unified flow control of multiple streams for a multiple camera device 500. The method includes monitoring the multiple streams for the multiple camera devices through a processor 502. Followed with, identifying each of the multiple streams as either an inline stream or an offline stream 504. Further processing, the Inline stream by reading the inline stream from multiple camera devices through mobile industry processor interface (MIPI) 506 and storing the inline stream in a first queue by a first FIFO structure 508. Processing of the offline stream occurs by saving the offline stream through MIVI interface into the DDR 510.

Reading the offline stream from the DDR and storing the offline stream in a second queue by utilizing a second FIFO structure 512. The reading of the inline stream is performed by initiation of a first READ operation, where reading of the offline stream is performed by initiation of a second READ operation. The first READ operation is initiated if a second read-threshold value (RTH-2) of the inline stream is greater than a first read-threshold value (RTH1), similarly the second READ operation is initiated if a second read-threshold value (RTH-2') of the offline stream is greater than the read-threshold value (RTH1').

The resource sharing is conducted by sharing bandwidth between the inline stream and the offline stream 514 through the inline offline resource sharing, providing a different time slot through an image signal processor (ISP) to form a shared stream. Then, checking shared streams for any priority enablement 516 and performs a write operation after checking status of write FIFO and storing content of the write FIFO in the DDR 518 to achieve unified flow control of the multiple streams. The writing of the inline stream is performed by initiation of a first WRITE operation, where writing of the offline stream is performed by initiation of a second WRITE operation. The first WRITE operation is initiated if a first write-threshold value (WTH-1) of the inline stream is smaller than a write-threshold value (WTH-2), further wherein the second WRITE operation is initiated if a second write-threshold value (WTH-3) of the offline stream is smaller than the write-threshold value (WTH-1).

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for achieving unified flow control of multiple streams for a multiple camera device, wherein the method comprising:
    monitoring the multiple streams for the multiple camera device through a processor;
    identifying each of the multiple streams as either an inline stream or an offline stream;
    processing the Inline stream by reading the inline stream from multiple camera device through mobile industry processor interface (MIPI);
    storing the inline stream in a first queue by a first FIFO structure;
    processing the Offline stream by saving the offline stream via MIVI interface into DDR;
    reading the offline stream from the DDR and storing the offline stream in a second queue by utilizing a second FIFO structure;
    sharing bandwidth between the inline stream and the offline stream by providing different time slots via an image signal processor (ISP) to form shared streams;
    checking the shared streams for any priority enablement; and
    performing a write operation after checking status of write FIFO and storing content of the write FIFO in the DDR to achieve unified flow control of the multiple streams.

2. The method for achieving unified flow control of multiple streams in accordance with claim 1, wherein the reading of the inline stream is performed by initiation of a first READ operation, further wherein reading of the offline stream is performed by initiation of a second READ operation.

3. The method for achieving unified flow control of multiple streams in accordance with claim 2, wherein the first READ operation is initiated if a first read-threshold value (RTH-1) of the inline stream is greater than a read-threshold value (RTH), further wherein the second READ operation is initiated if a second read-threshold value (RTH-2) of the offline stream is greater than the read-threshold value (RTH).

4. The method for achieving unified flow control of multiple streams in accordance with claim 1, wherein the writing of the inline stream is performed by initiation of a first WRITE operation, further wherein writing of the offline stream is performed by initiation of a second WRITE operation.

5. The method for achieving unified flow control of multiple streams in accordance with claim 2, wherein the first WRITE operation is initiated if a first write-threshold value (WTH-1) of the inline stream is greater than a write-threshold value (WTH), further wherein the second WRITE operation is initiated if a second write-threshold value (WTH-2) of the offline stream is greater than the write-threshold value (WTH).

6. The method for achieving unified flow control of multiple streams in accordance with claim 1, wherein the inline stream and the offline stream are controlled to adjust a quality of service (QoS).

7. The method for achieving unified flow control of multiple streams in accordance with claim 1, wherein the priority enablement is performed through a HURRY operation.

8. The method for achieving unified flow control of multiple streams in accordance with claim 7, wherein the HURRY operation pushes a low priority streams from the shared stream to avoid blocking of a high priority streams from shared streams.

9. The method for achieving unified flow control of multiple streams in accordance with claim 1, wherein a write operation is performed directly when the status of the write FIFO is empty.

10. The method for achieving unified flow control of multiple streams in accordance with claim 1, wherein an assertion to READ FIFO is sent to perform STALL function when the status of the write FIFO is full.

11. The method for achieving unified flow control of multiple streams in accordance with claim 10, wherein the STALL function stops reading further shared streams till the WRITE FIFO is empty.

12. The method for achieving unified flow control of multiple streams in accordance with 1, wherein the time slots include a first time slot and a second time slot.

13. The method for achieving unified flow control of multiple streams in accordance with claim 12, wherein the first time slot process one line of the inline stream.

14. The method for achieving unified flow control of multiple streams in accordance with claim 12, wherein the second time slot process one line of the offline stream.

* * * * *